MATED THIN FILM MEMORY ELEMENT

Filed Oct. 23, 1965 2 Sheets-Sheet 1

INVENTORS
ROBERT J. BERGMAN
LEROY A. PROHOFSKY
BY Thomas J. Nikolai
ATTORNEY

INVENTORS
ROBERT J. BERGMAN
LEROY A. PROHOFSKY
BY Thomas J. Nikolai
ATTORNEY

United States Patent Office 3,357,004
Patented Dec. 5, 1967

3,357,004

MATED THIN FILM MEMORY ELEMENT

Robert J. Bergman, St. Paul, and Leroy A. Prohofsky, Minneapolis, Minn., assignors to Sperry Rand Corporation, New York, N.Y., a corporation of Delaware Filed Oct. 23, 1965, Ser. No. 502,820
5 Claims. (Cl. 340—174)

ABSTRACT OF THE DISCLOSURE

A magnetizable memory element that includes two superposed thin-ferromagnetic-film layers. Each layer has a central body portion that envelops a first drive line wherein said central body portions have sides overlapping the enveloped drive line. The overlapping sides form closely-coupled mated-film portions on both sides of said enveloped drive line thereby creating a substantially-closed flux path about the enveloped drive line. Further included is a second drive line that envelops said body portion. The film layers have portions extending from said body portion and away from said first and second drive lines for reducing the transverse demagnetizing field affecting the remanent magnetization of the body-portion-formed substantially-closed flux path The present invention is an improvement in the mated-film memory element disclosed in the copending patent application of K. H. Mulholland, ERA-1264, Ser. No. 498,743, filed Oct. 20, 1965, assigned to the Sperry Rand Corporation as is the present invention. The copending K. H. Mulholland application discloses a mated-film element that includes two thin-ferromagnetic-film layers that are formed in a stacked, superposed relationship about a suitable drive line and whose overlapping sides form closely-coupled mated-film portions creating a substantially-closed flux path about the enveloped drive line. The enveloped drive line is typically a common bit and sense line used to sense the element's output during the read operation and to carry bit current during the write operation. The axis of anisotropy, or easy axis, is in the circumferential direction about the enveloped drive line, i.e., orthogonal to the longitudinal axis of the enveloped drive line, whereby the enveloped drive line provides a longitudinal drive field $H_l$ in a circumferential direction about the enveloped drive line in the area of the mated-film element causing the flux in the two layers of the mated-film element to become aligned in an antiparallel relationship. A second drive line, preferably a printed circuit member, running over and returning under the mated-film element is oriented with its longitudinal axis parallel to the easy axis of the mated-film element whereby the enveloping drive line when coupled by an appropriate current signal produces a transverse drive field $H_t$ in the area of the mated-film element. The resulting product constitutes a memory cell that processes all the desirable characteristics of a planar, thin-ferromagnetic-film memory element while being substantially unaffected by the creep phenomenon.

The present invention is an improvement of such copending application of K. H. Mulholland in that there is provided herein a mated-film element wherein the thin-ferromagnetic-film layers that form the mated-film element also provide portions substantially out of the area of and insubstantially inductively coupled to the associated drive lines. The winged portions, formed as integral parts of the two thin-ferromagnetic-film layers, provide a means for reducing the transverse demagnetizing fields affecting the magnetization in the mated-film portions thus providing an improved resistance to the creep phenomenon and providing a mated-film element operable with drive fields of lower intensities. Additionally, the present invention provides a mated-film element that may be formed wholly by a continuous vapor deposition process. The thin-ferromagnetic-film layers of the preferred embodiment have single domain properties although such is not required by the present invention. The term "single domain property" may be considered the magnetic characteristic of a three-dimensional element of magnetizable material having a thin dimension that is substantially less than the width and length thereof wherein no magnetic domain walls can exist parallel to the large surface of the element. The term "magnetizable" material shall designate a substance having a remanent magnetic flux density that is substantially high, i.e., approaches the flux density at magnetic saturation.

Accordingly, it is the primary object of this invention to provide a novel memory element that may be fabricated by a continuous deposition process.

These and other more detailed specific objectives will be disclosed in the following specification, reference being had to the accompanying drawings in which.

Figures 1, 2, 3, 4, 5:
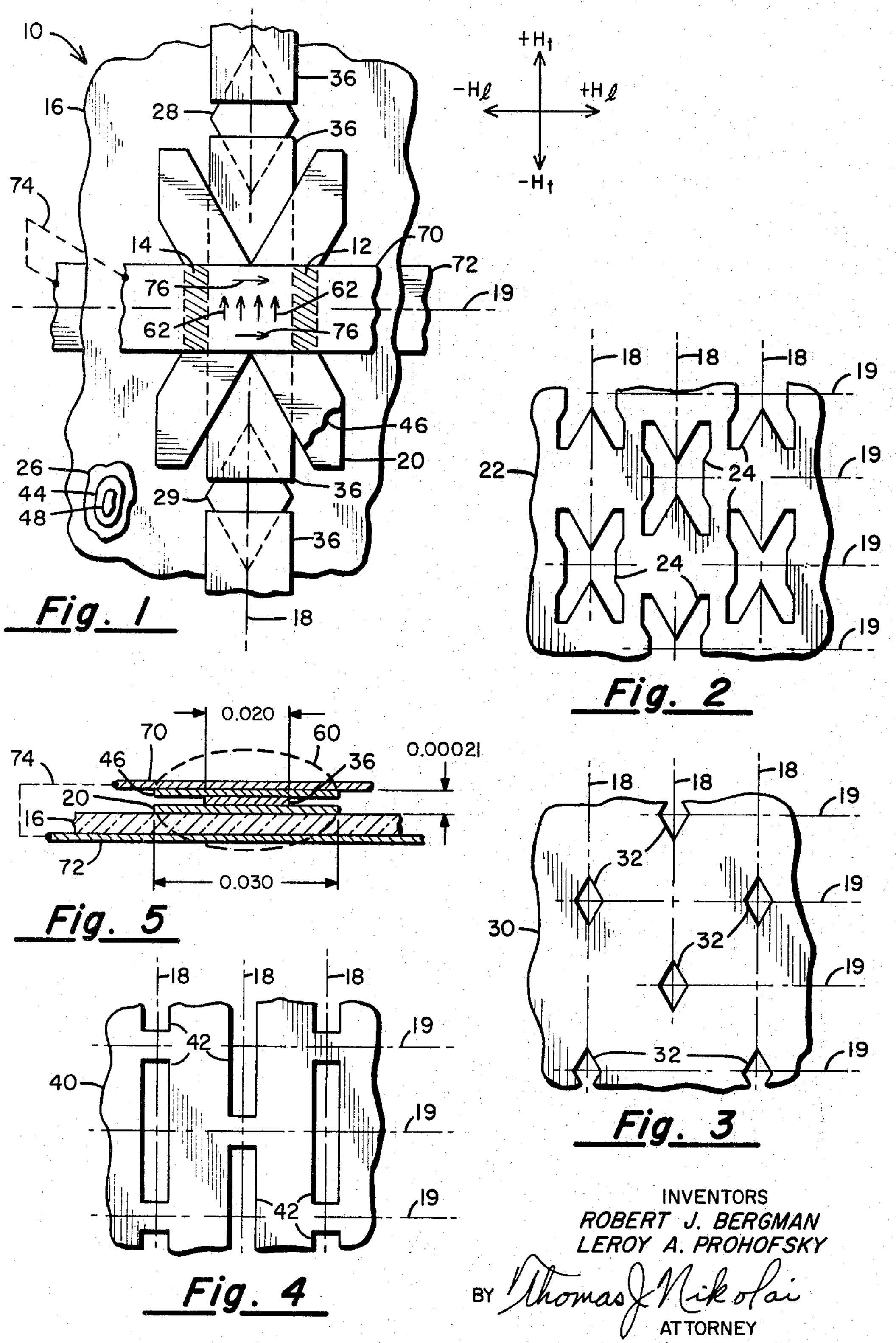
FIG. 1 is a plan view of the mated-film element of the present invention.
FIG. 2 is an illustration of a mask utilized to fabricate the element of FIG. 1.
FIG. 3 is an illustration of another mask utilized to fabricate the element in FIG. 1.
FIG. 4 is an illustration of another mask utilized to fabricate the element of FIG. 1.
FIG. 5 is a diagrammatic illustration of a cross section of element 10 taken along axis 19.

With particular reference to FIG. 1 there is presented an illustration of a plane view of the mated-film element 10 of the present invention. As discussed hereinabove, and in more detail in the above discussed copending patent application of K. H. Mulholland, the mated-film element achieves its unique operating characteristic, as compared to coupled-film elements, due to the sandwiched arrangement of the thin-ferromagnetic-film layers and the enveloped bit line. The two thin-ferromagnetic-film layers are formed in a stacked, superposed relationship about the bit line with such film layers having sides overlapping the enveloped bit line whereby there is formed at the overlapping sides closely-coupled mated-film portions of such film layers that create a substantially-closed flux path about the enveloped bit line. The shaded areas defining these closely-coupled mated-film areas of memory element 10 of FIGURE 1 are identified by the reference numbers 12 and 14.

Element 10 is composed of a plurality of stacked, superposed layers, some having a contour or shape that is specifically designed to permit the fabrication thereof in a continuous series of discrete deposition steps wherein there are utilized a plurality of shape defining "masks," one for each layer for the definition of the different layers. However, element 10 may be formed by any one of the plurality of well-known methods of fabricating magnetizable memory elements; for discussion of some such methods see the copending patent applications of W. W. Davis, Ser. No. 254,913, filed Jan. 30, 1963, now Patent No. 3,276,000 and P. E. Oberg et al., Ser. No. 332,220, filed Dec. 20, 1963, both assigned to the same assignee as is the present invention. Element 10 is formed in the preferred embodiment in the following steps:

(A) The base element of element 10 is planar glass substrate 16 of 0.006 inch thickness. Axes 18, 19 are utilized only to define the major and minor axes, respectively, of element 10 for purposes of orienting the elements and the magnetic axes thereof.

(B) Upon substrate 16 and centered about axes 18, 19 is vapor deposited an X-shaped thin-ferromagnetic-film layer 20 of 4,000 angstroms (A) in thickness and approximately 80% Ni=20% Fe and having an anisotropic axis aligned with axis 19 providing an easy axis thereby. With particular reference to FIG. 2 there is illustrated a portion of a mask 22 having apertures 24 therethrough, each defining the contour of a similar layer 20, when utilized in a continuous deposition process such as disclosed in the S. M. Rubens et al. Patent No. 3,155,561.

(C) Next, a silicon monoxide (SiO) layer 26 of 5,000 A. in thickness is vapor deposited on layer 20 and substrate 16.

(D) Next, upon layer 26 and centered along axis 19 and about axis 18 are vapor deposited two copper interconecting strips 28, 29 of 40,000 A. in thickness. With particular reference to FIG. 3 there is illustrated a portion of a mask 30 having a plurality of apertures 32 therethrough, each defining the contour of strips 28, 29 when utilized in a continuous deposition process as described above.

(E) Next, upon layer 20 and centered along axis 18 and about axis 19 and extending over the ends of strips 28, 29 so as to form a continuous electrical circuit therewith is vapor deposited bit line 36 of 40,000 A. in thickness. With particular reference to FIG. 4 there is illustrated a portion of a mask 40 having a plurality of apertures 42 therethrough each defining the contour of a strip 36 when utilized in a continuous deposition process as discussed above.

(F) Next, a SiO layer 44 of 5,000 A. in thickness is vapor deposited on layer 26 and conductive strips 28, 29 and 36.

(G) Next, upon layer 44 and superposed above layer 20 is vapor deposited an X-shaped thin-ferromagnetic-film layer 46 of 4,000 A. in thickness and approximately 80% Ni=20% Fe and having an anisotropic axis aligned with axis 19 providing an easy axis thereby. Mask 22 of FIG. 2 may be utilized for the fabrication of layer 46 in a similar manner in which layer 20 was fabricated in paragraph B above.

(H) Lastly, a SiO layer 48 of 2,500 A. in thickness is vapor deposited over the entire stacked assembly for the sealing thereof.

It has been found by the applicant that the insulating layers of SiO provide poor insulating characteristics when element 10 is fabricated in a continuous deposition process. Due to the changing environmental conditons (temperature, pressure, etc.) within the evacuatable enclosure during the deposition process and to the irregular surfaces of the metallic layers the layers of SiO may develop pinholes and crack-like apertures therethrough through which the currents flowing through the drive lines may short through to the metallic layers. Consequently, to ensure desirable operation thereof each element 10 is electrically insulated from each other by no two elements 10 having common magnetizable material whereby there is prevented the possibility of the shorting of parallel adjoining lines 28, 29 and line 36.

As stated above the layers of SiO provide poor electrical insulating characteristics. However, the layers of SiO are essential in the continuous deposition process to prevent the diffusion of the layers of magnetizable material and copper, particularly in the areas of area 60, see FIG. 5. With the magnetic characteristics of memory area 60 being critical for the proper operation of element 10 it is essential that diffusion of such metals be prevented. Accordingly, although such layers of SiO are not relied upon to provide electrical insulating characteristics such layers are utilized to preclude contamination of the magnetizable layers during the continuous deposition process.

As disclosed in the aforementioned K. H. Mulholland application, area 60, see FIG. 5, is the memory or active area of element 10 in which the binary information is written and from which the binary information is read. As the magnetizable material in the mated-film areas 12, 14 of FIG. 1 plays no or little part in providing an output signal to bit line 36 but does provide areas of high permeability, i.e., low reluctance, to the transverse drive field $H_t$ represented by arrows 62 of FIGURE 1, it is desirable that the amount of magnetizable material in the mated-film areas be kept to a minimum such that the transverse drive field $H_t$ be concentrated in the area of area 60 that is contiguous to bit line 36. Additionally, as substantial portions of the areas 12, 14 are not substantially affected by the drive field intensities utilized in the operation of element 10 the magnetizable material in such areas, particularly in whose areas the furthest distance from bit line 36, contain many disoriented magnetic domains contributing substantially large demagnetizing fields to memory area 60. Accordingly, it is desirable that the amount of magnetizable material in the mated-film areas 12, 14 of FIG. 1 be kept to a minimum consistant with requirements of producibility and operability of element 10.

As the layers of SiO provide poor electrical insulating characteristics it is desirable that the enveloping word lines 70, 72 (at least word line 70) be not laid down in a continuous deposition process although such may be possible if a relatively thick (50,000 A.) layer 48 of SiO be utilized. However, applicant has determined that a most efficient packaging of the final memory plane assembly may be achieved by the use of printed circuit conductors 70, 72 of 4,000 A. in thickness supported by a Mylar substrate of 0.005 inch in thickness and affixed to the appropriate surfaces of substrate 16 by a suitable adhesive. Such arrangement is shown in the hereinabove reference patent application of W. W. Davis.

With particular reference to FIG. 5 there is presented a diagrammatic illustration of a cross-section of element 10 taken along axis 19 with layers 26, 44 and 48 omitted for the sake of clarity. FIG. 5 points out the approximate dimensions of the memory area 60 of element 10 of the illustrated embodiment as indicating a width-to-thickness ratio of approximately 150.

The memory plane assembly formed by the sandwiched construction of substrate 16 through word drive line 70, 72 is an integral package and in its preferred embodiment is formed in part by a continuous deposition process as disclosed in the aforementioned S. M. Rubens patent and as discussed above. In this arrangement in the preferred embodiment the magnetizable layers 20 and 46 are formed with an anisotropic axis parallel to axis 19. A current signal coupled to conductive strip 36 establishes a longitudinal drive field $H_l$, particularly in layers 20 and 46 of memory area 60, in a circumferential direction about bit line 36 of a first or second and opposite direction representative of a stored 1 or 0 as a function of the polarity of the current signal applied thereto. With a proper current signal coupled to intercoupled word lines 70, 72 (by a conductive strip 74, see FIG. 1) there is established in the area 60 a transverse drive field $H_t$ that tends to align the magnetization M of layers 20 and 46 in the area 60 into substantial alignment along the hard axis of area 60, i.e., that lies along a line parallel to axis 18.

With reference back to FIG. 1 there is illustrated a plan view of element 10 that illustrates the general configuration of the alignment of the magnetic flux generated by current signals flowing through word lines 70, 72 and bit line 36. With a suitable current signal coupled to word lines 70, 72 there is established about such word lines a magnetic field represented by arrows 62 flowing in a circumferential direction thereabout. This circumferential field about lines 70, 72 seeks a path of low reluctance, and, accordingly, concentrates in the paths presented by layers 20 and 46. Further, with a suitable current signal coupled to bit line 36 there is established in area 60 a magnetic field represented by arrows 76 flowing in a circumferential direction about bit line 36 of a first or second and opposite direction represensentative of a stored 1 or a 0 as a function of the polarity of the current signal applied thereto. This magnetic flux in area 60 is a longitudinal drive field $H_l$ oriented parallel to the easy axis of area 60 that is aligned with axis 19 and tends to cause the magnetization M of area 60 to become aligned with axis 19. With the magnetic fields schematically illustrated by arrows 62 and 76 established by suitable current signals flowing through word lines 70, 72 and bit line 36 being, in area 60, in substantial alignment with axis 18 and axis 19, respectively, there are provided two magnetic fields orthogonal to each other in the area of area 60 that are vectorially additive such that by the proper selection of relative field intensities the magnetization M of area 60 may be established into any one of a plurality of previously determined magnetic states in a rotational mode as disclosed as in the S. M. Rubens et al. Patent No. 3,030,612.

Figure 6:
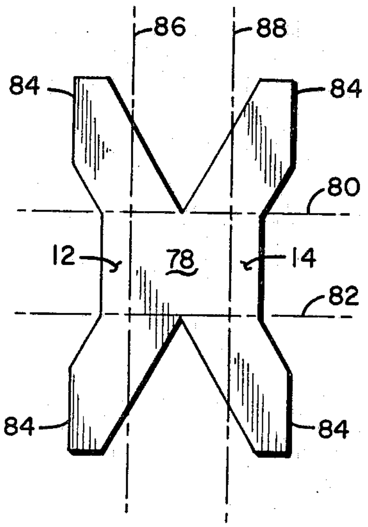
FIG. 6 is an illustration of the planar outline of the magnetizable layers of the element of FIG. 1.

As stated hereinabove the present invention involves the addition of winged portions to the mated-film element of the above referenced application of K. H. Mulholland. With particular reference to FIG. 6 there is illustrated the planar outline of element 10 of the present invention. The mated-film element of the Mulholland application essentially consists of the active, main body portion 78 between lines 80, 82 which body portion is also that portion enveloped by the enveloping word lines 70, 72—see FIG. 1—and which main body portion is closely coupled thereto. External to lines 80, 82 are four inactive, i.e., are substantially decoupled from lines 70, 72 and line 36, winged portions 84 that are extensions of layers 20, 46, and that substantially improve the memory operating characteristics of the active memory area 78 of element 10 by substantially reducing the history effects of partial-select transverse drive fields $H_t$ coupled thereto by word lines 70, 72 and by materially reducing the word drive field $H_t$ intensity requirements necessary for the satisfactory operation of memory area 78. Between lines 86, 88 is a second portion (superposed bit drive line 36 and except for the triangular portions thereof that are external to lines 80, 82) that is substantially coupled to bit line 36.

The inactive areas 84 provide a flux path for the word line generated transverse drive fields causing a substantial majority of the free poles that would normally be situated in the mated-film areas 12, 14, to move from each of such areas 12, 14 out into the inactive areas 84. These free poles are well known in the art of thin-ferromagnetic-film elements—see the copending application of P. D. Barker, et al. Serial No. 400,183, filed September 29, 1964, for a discussion of such free poles, a method of generation, and a method of reduction thereof—and largely account for the large demagnetizing fields that contribute to the creep phenomenon in open-flux-path, planar, thin-ferromagnetic-film elements. By providing areas 84 of magentizable material integral with but away from area 78 in which such free poles are normally caused to reside the demagnetizing fields that are associated with such free poles are substantially reduced in active area 78.

To best understand the nature of the formation of free poles, which free poles may be thought of as localized areas of magnetization in areas 12, 14 that are disoriented or nonaligned with the majority of the magnetization in area 78 that is aligned with easy axis 18, it is necessary to understand the nature of the orientation of the magnetization in area 78. Generally, the magnetization in area 78 is aligned in a first or second and opposite direction along axis 19 representative of a stored 1 or 0 as determined by the polarities of the longitudinal drive fields $H_l$ provided by the energized bit line 36. However, to align the magnetization in the extremities of areas 12, 14, i.e., those portions of areas 12, 14 that are along the edges of layers 20, 46 and furthest from bit line 36, it would be necessary to couple inordinately intense longitudinal drive fields thereto. Generally then, the current signals coupled to bit line 36 are chosen to be of such an intensity as to merely align the magnetization in area 78 and the contiguous areas of areas 12, 14, with the extremities of areas 12, 14 generally thought to assume a demagnetized or zero net magnetic state.

However, when element 10 is in a matrix array of a plurality of elements 10 a plurality of partial-select write fields $H_t$ provided by the common energized word drive lines 70, 72 tend to cause the magentization of areas 12, 14 to become aligned with the word drive fields; this effect is called the history effect in that the magnetization of areas 12, 14 tends to be set into a state determined by the history of the prior applied write pulses not associated with the writing operation of the particular element 10 concerned. Accordingly, by providing wings 84 the free poles normally situated in areas 12, 14 are moved therefrom into such wings 84 and away from, i.e., substantially decoupled from and thus substantially unaffected by the partial select write fields, area 78. The setting or movement of the free poles into areas 84 provides a decreased demagnetizing field in the areas of areas 12, 14, and thus area 78, which reduction in demagnetizing fields in area 78 reduces the drive field requirements that would normally be required to overcome such demagnetizing fields, i.e., such demagnetizing fields absorb drive field energy that would be provided for the writing operation.

As an example of the improvement in the operation of element 10 in the present invention as compared to a comparable element of the K. H. Mulholland application which would generally be comparable to area 78 of FIG. 6 it was found that the addition of wings 84 to memory area 78 reduced word drive current requirements from 1.20 amperes to 0.60 ampere and yet increased the creep threshold 50%. The creep threshold as used here is defined as the maximum amplitude or intensity, of the write drive fields that may be coupled to the element 10 for a minimum of $10^6$ pulses while yet not so adversely affecting the magnetization of area 78 as to preclude the determination of the informational state, i.e., whether in a prior stored 1 to 0 state, of the affected element 10 upon readout. As can be seen from a definition of creep threshold it is a means of determining the resistance of the memory element to the deleterious affects of the creep phenomenon.

Figure 7:
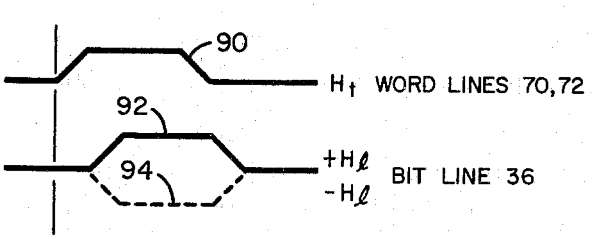
FIG. 7 is an illustration of the signal waveforms associated with the write operation of the element of FIG. 1.

With particular reference to FIG. 7 there are illustrated the waveforms of the current signals utilized to accomplish the writing operation of element 10. In this arrangement transverse drive field 90 is initially applied to element 10 by a current signal flowing through word lines 70, 72 rotating the magnetization M of area 60 out of alignment with its anisotropic axis 19. Next, longitudinal drive field 92 for the writing of a 1 or longitudinal drive field 94 for the writing of a 0 is applied in the area of 60 by suitable polarity drive signals coupled to bit line 36 which longitudinal drive field $H_l$ steers the magnetization of area 60 into the particular magnetic polarization along anisotropic axis 19 that is associated with the respective polarity of waveforms 92, 94.

Figure 8:
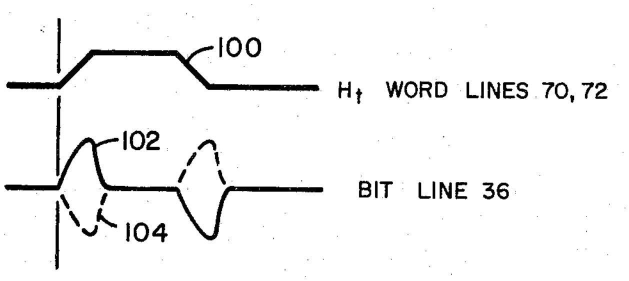
FIG. 8 is an illustration of the signal waveforms associated with the read operation of the element of FIG. 1.

With particular reference to FIG. 8 there are illustrated the signal waveforms associated with the reading operation of element 10. The readout operation is accomplished by the coupling of an appropriate current signal to word lines 70, 72 thus generating in the area of area 60 a transverse drive field 100 that is below the reversible limit of the memory area 60 and that rotates the magnetization of area 60 out of alignment with its anisotropic axis 19 inducing in common bit-sense line 36 output signal 102 or 104 indicative of a stored 1 or 0, respectively, in area 60. As illustrated here, the polarity phase of the output signal during the readout operation is indicative of the informational state of the memory element 10 concerned.

As stated above, the present invention is concerned with a means of providing an improved magnetizable memory element. This improvement involves the addition of extensions to the mated-film element of the above discussed K. H. Mulholland application. These extensions are integral parts of the magnetizable layers but do not perform a memory function; however, the extensions perform the function of providing larger—increasing the memory area—flux return paths for the transverse drive fields provided by the enveloping word lines. Generally then, the novelty of the present invention involves the addition of inactive areas to the active area i.e., to the memory area. These inactive areas are inactive in that they provide no memory function as they are effectively decoupled from, i.e., insubstantially magnetically coupled to, the enveloped drive line that provides the longitudinal drive fields in the memory area.

The embodiment of FIG. 1 illustrates one method of providing the desired inactive areas 84—those areas external to lines 80, 82 of FIG. 6—that are effectively decoupled from bit line 36 but do provide an improved coupling with word lines 70, 72. In this embodiment areas 84 are effectively decoupled from bit line 36 by a slot extending inwardly to the active area 78 at lines 80, 82. Although bit lines 36 is sandwiched between layers 20, 46 external to lines 80, 82 it is not enveloped by such layers as such layers do not form a closed flux path thereabout due to the slotted portion extending to lines 80, 82. However, in active area 78 such layers do both sandwich and envelop bit line 36, due to the closely-coupled mated-film portions 12, 14, forming a substantially-closed flux path thereabout forming memory area 60.

Figure 9:
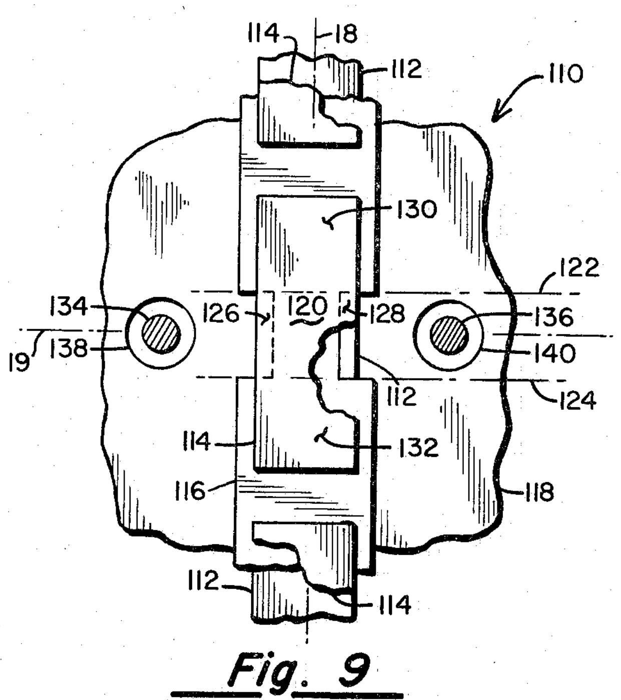
FIG. 9 is a plan view of a second embodiment of the present invention.

With particular references to FIG. 9 there is illustrated another embodiment of the present invention with any necessary insulating layers omitted for the sake of clarity. In this embodiment of memory element 110, thin-ferromagnetic-film layers 112, 114 sandwich bit line 116 therebetween, all in a superposed relationship upon substrate member 118. The active, or memory, area 120 of element 110 lies between lines 122, 124 wherein bit line 116 is narrower than superposed film layers 112, 114 forming the two closely-coupled mated-film portions 126, 128. External to lines 122, 124 in inactive areas 131, 132 bit line 116 is wider than superposed film layers 112, 114; thus, although bit line 116 is sandwiched between layers 112, 114 external to lines 122, 124 it is not enveloped by such layers as such layers do not form a closed flux path thereabout due to the extensions of bit line 116 beyond the sides of layers 112, 114. Word lines 134, 136 pass vertically through apertures 138, 140, respectively, in substrate 118 and are preferably intercoupled at one end so as to provide additive transverse drive fields, i.e., transverse to the circumferential flux path about bit line 116, in memory area 120. As in the embodiment of FIG. 1 the extensions of the film layers 112, 114 in the inactive areas 130, 132 provide larger flux return paths for such transverse drive fields provided by the enveloping word lines 134, 136 and provide areas external to the active memory area 120 whereby a substantial majority of the free poles that would otherwise be situated in the mated-film areas 126, 128 may reside.

Thus, it is apparent that there has been described herein a preferred embodiment of the present invention that provides a novel memory and method of packaging thereof that provides an improved volumetric efficiency required decreased drive current intensities over prior art arrangements. It is understood that suitable modifications may be made in the structure as disclosed provided that modifications come within the spirit and scope of the appended claims. Having now fully illustrated and described our invention that we claim to be new and desire to protect by Letters Patent is set forth in the appended claims.

What is claimed is:

1. A magnetizable memory element comprising:
a substrate member;
a first layer of magnetizable material;
said first film layer having an active body portion that has inactive end portions extending therefrom;
a second layer of magnetizable material having substantially similar magnetic characteristics and planar contours as said first layer and superposed said first layer;
a first conductive strip sandwiched between and enveloped by said first and second layers only in the area of said body portions;
said first and second layers having superposed sides extending beyond the edges of said first conductive strip for forming a substantially-closed flux path in a circumferential direction about said enveloped first conductive strip only in the area of said body portions.

2. A magnetizable memory element comprising:
a substrate member;
a first thin-ferromagnetic-film layer of a magnetizable material having single domain properties and possessing the property of uniaxial anisotropy for providing an easy axis in the plane of said film layer along which the layer's remanent magnetization shall lie;
said first magnetic layer having an active body portion and inactive end portions;
a first conductive strip superposed said layer and having a width in said body portion that is narrower than said body portion and having a width in said end portions that is wider than said end portions for forming edges of said body portion that extend beyond and along said first conductive strip in said body portions;
a second magnetic layer having substantially similar magnetic characteristics atnd planar contours as said first magnetic layer and superposed said first magnetic layer;
said first conductive strip sandwiched between and enveloped only by said first and second magnetic layers' body portions;
said first and second magnetic layers having superposed sides in the area of their respective body portions and along and extending beyond the edges of said first conductive strip in the area of said body portions for forming closely-coupled mated-film portions for creating a substantially-closed flux path in a circumferential direction about said enveloped first conductive strip in the area of said body portions and parallel said easy axes;
said superposed first and second magnetic layers' body portions and said enveloped first conductive strip forming a memory area;
binary information stored in said memory area in a first or second and opposite circumferential flux direction about said enveloped first conductive strip.

3. A magnetizable memory element comprising:
a substrate member;
a first thin-ferromagnetic-film layer of a magnetizable material having single domain properties and possessing the property of uniaxial anisotropy for providing an easy axis in the plane of said film layer along which the layer's remanent magnetizaton shall lie;
said first magnetic layer having a body portion and which body portion has winged portions extending from each corner thereof;
a first conductive strip superposed said body portion and having a width that is narrower than said body portion for forming edges of said body portion that extend beyond and along said first conductive strip;

a second magnetic layer having substantially similar magnetic characteristics and planar contours as said first magnetic layer and superposed said first magnetic layer;

said first conductive strip sandwiched between and enveloped by said first and second magnetic layers only in the area of said body portions;

said first and second magnetic layers having superposed sides in the area of their respective body portions and along and extending beyond the edges of said first conductive strip for forming closely-coupled mated-film portions for creating a substantially-closed flux path in a circumferential direction about said enveloped first conductive strip and parallel said easy axes;

said superposed first and second magnetic layers' body portions and said enveloped first conductive strip forming a memory area;

binary information stored in said memory area in a first or second and opposite circumferential flux direction about said enveloped first conductive strip.

4. A magnetizable memory element comprising:

a planar substrate member;

a first thin-ferromagnetic-film layer of a magnetizable material having single domain properties and posessing the property of uniaxial anisotropy for providing an easy axis in the plane of said film layer along which the layer's remanent magnetization shall lie;

said first film layer including an active body portion having inactive end portions extending therefrom;

a first insulating layer superposed said first film layer at least in the area of said body portion;

a first conductive strip superposed said body portion and having along a longitudinal axis a width in the areas of said said body portion that is narrower than said body portion for forming edges of said body portion that extend beyond and along said first conductive strip;

a second insulating layer superposed said first conductive strip at least in the area of said body portion;

a second thin-ferromagnetic-film layer having substantially similar magnetic characteristics and planar contours as said first film layer and superposed said first film layer;

said first conductive strip sandwiched between and enveloped by said first and second film layers only in the area of said body portions;

said first and second film layers having superposed sides in the area of their respective body portions and along and extending beyond the edges of said first conductive strip for forming closely-coupled mated-film portions for creating a substantially-closed flux path in a circumferential direction about said enveloped first conductive strip only in the area of said body portions and parallel said easy axes;

said easy axes of said first and second film layers aligned orthogonal to the longitudinal axis of said enveloped first conductive strip and in the substantially-closed flux path circumferential-direction about said enveloped first conductive strip;

second and third conductive strips enveloping said first and second film layers' body portions, for coupling transverse drive fields to said enveloped body portions;

said superposed first and second film layers' body portions and said enveloped first conductive strip forming a memory area;

binary information stored in said memory area in a first or second and opposite circumferential flux direction about said enveloped first conductive strip; and an energized said first enveloped conductive strip generating in said memory area first or second and opposite direction circumferential magnetic fields about said enveloped first conductive strip.

5. A magnetizable memory element comprising:

a planar substrate member;

a first thin-ferromagnetic-film layer of a magnetizable material having single domain properties and possessing the property of uniaxial anisotropy for providing an easy axis in the plane of said film layer along which the layer's remanent magnetization shall lie;

said first film layer including a body portion having angled portions extending therefrom;

a first insulating layer superposed said first film layer at least in the area of said body portion;

a first conductive strips superposed said body portion and having along a longitudinal axis a width in the areas of said body portion that is narrower than said body portion for forming edges of said body portion that extend beyond and along said first conductive strip;

a second insulating layer superposed said first conductive strip at least in the area of said body portion;

a second thin-ferromagnetic-film layer having substantially similar magnetic characteristics and planar contours as said first film layer and superposed said first film layer;

said first conductive strip sandwiched between and enveloped by said first and second film layers only in the area of said body portions;

said first and second film layers having superposed sides in the area of their respective body portions and along and extending beyond the edges of said first conductive strip for forming closely-coupled mated-film portions for creating a substantially-closed flux path in a circumferential direction about said enveloped first conductive strip only between said angled portions and parallel said easy axes;

said easy axes of said first and second film layers aligned orthogonal to the longitudinal axis of said enveloped first conductive strip and in the substantially-closed flux path circumferential-direction about said enveloped first conductive strip;

second and third conductive strips enveloping said first and second film layers' body portions, respectively, for coupling transverse drive fileds to said enveloped body portions;

said superposed first and second film layers' body portions and said enveloped first conductive strip forming a memory area;

binary information stored in said memory area in a first or second and opposite circumferential flux direction about said enveloped first conductive strip; and an energized said first enveloped conductive strip generating in said memory area first or second and opposite direction circumferential magnetic fields about said enveloped first conductive strip.

References Cited

IBM Technical Disclosure Bulletin: "Thin Film Memory Element Demagnetization Reduction Method," by Penoyer, vol. 7, No. 6, November 1964, page 490.

IBM Technical Disclosure Bulletin: "Biaxial Magnetic Thin Film Memory System and Method of Making Films for Same," by Berkowitz et al., vol. 7, No. 1, June 1964, page 66.

BERNARD KONICK, *Primary Examiner.*

S. URYNOWICZ, *Assistant Examiner.*